United States Patent [19]

Merle et al.

[11] 3,907,230

[45] Sept. 23, 1975

[54] TAPE DRIVE SYSTEM

[75] Inventors: Jean Pierre Merle, Clamart; Claude Pavie, Montesson, both of France

[73] Assignee: Schlumberger Instruments et Systemes, Paris, France

[22] Filed: Aug. 6, 1973

[21] Appl. No.: 385,690

[30] Foreign Application Priority Data

Aug. 21, 1972 France .............................. 72.29775
Mar. 6, 1973 France .............................. 07935

[52] U.S. Cl. ................ 242/192; 226/118; 226/171; 242/67.5

[51] Int. Cl.[2] ............... G11B 15/32; G11B 23/08; G11B 23/06; B65H 17/14

[58] Field of Search ......... 242/192, 151, 75.2, 75.3, 242/67.5; 74/242.9, 242.11 C; 226/171, 170, 226/172, 188, 118

[56] References Cited

UNITED STATES PATENTS

| | | | |
|---|---|---|---|
| 518,314 | 4/1894 | Egger et al. | 74/242.9 |
| 2,909,341 | 10/1959 | Kingsley | 242/151 |
| 3,125,311 | 3/1964 | Willis | 242/192 |
| 3,244,341 | 4/1966 | Gilman | 226/171 UX |
| 3,297,268 | 1/1967 | Sawazaki | 242/192 |
| 3,456,858 | 7/1969 | Keogh | 226/170 X |
| 3,467,338 | 9/1969 | Breuer | 242/192 |
| 3,620,473 | 11/1971 | Stone | 242/192 |
| 3,624,772 | 11/1971 | Grunwald | 242/192 |
| 3,692,255 | 9/1972 | Von Behren | 242/192 |

FOREIGN PATENTS OR APPLICATIONS

| | | | |
|---|---|---|---|
| 706,197 | 3/1931 | France | 242/67.5 |
| 1,195,159 | 5/1959 | France | 226/171 |

*Primary Examiner*—George F. Mautz
*Attorney, Agent, or Firm*—William R. Sherman, Esq.; Stewart F. Moore, Esq.; Walter C. Farley, Esq.

[57] ABSTRACT

In accordance with an illustrative embodiment of the present invention, a tape drive system has two tape packs mounted for rotation in a housing. An endless elastic belt is mounted around two rollers to engage the tape packs on their periphery. A first roller is urged by the tension of the belt against the two tape packs and the belt is squeezed between each pack and this first roller. This squeezing action opposes the movement of the belt producing on the belt a tauter portion and a slacker portion which create a tension on the tape. All rotating parts are mounted without friction and only one external drive applied either to the tape or to anyone of these rotating parts is sufficient to drive the tape with a constant speed and a constant tension.

19 Claims, 11 Drawing Figures

TAPE DRIVE SYSTEM

The present invention relates to a tape drive system wherein a belt contacts the tape and more particularly to such tape drive systems for magnetic tape recorders.

Belt driven systems have been known for many years. Such a system is described in French Pat. No. 706,197 and comprises a non-elastic belt contacting the reel packs of a magnetic recorder. This type of drive system has a very important advantage as compared to conventional drive engaging the shafts of the reel packs. In these conventional systems a difficult problem stems from the changes in diameter and in angular speed of the reel packs when one reel is paid out and the other taken up. This problem is solved if the reels are driven tangentially by the belt.

More recent systems have been found which use a non-slip elastic belt. Such a system described in U.S. Pat. No. 3,305,186 comprises a frame, two reel hubs rotatably mounted on the frame and a tape wound around the reel hubs. Tape guiding means is provided for defining a tape path between the reel hubs. A belt path engaging arcuate portion of the tape around the reel hubs is defined by belt guiding means and a pretensioned endless elastic belt extending around the belt guiding means engages the arcuate tape portions in a slipless relationship. The non slip elastic belt has the property of creating a tension on the tape path between the two reels. This latter property is however subject to a condition. The belt must be mounted nonslippingly on two rollers which rotate at different tangential speeds. The reasons for this arrangement are explained in greater detail below.

For this purpose, there are two known embodiments. The first embodiment, described in the above-mentioned U.S. patent, uses a differential drive on the two rollers. This differential drive can be obtained, for example, by means of a second belt mounted on drive heads, of different diameters, respectively integral with the two rollers. This system is relatively complex owing to the very nature of the differential drive and requires a precise calculation of the driving head diameters in order to obtain a suitable tape tension.

A second simpler embodiment consists of driving only the high-speed roller and of mounting a braking device on the low-speed roller or the supply reel. These braking devices, often designed in the form of friction bearings, however have many drawbacks. Firstly, it is difficult to reproduce braking devices exerting the same force. Secondly, this force varies with temperature owing to the expansion of the different components. Finally, this braking force is not stable when the system is exposed to shocks or vibrations. In the particular case of airborne recorders, these systems are subjected to severe temperature and vibration conditions. Friction bearings, whatever care is given to their design, are then difficult to use owing to their lack of reliability and reproducibility and to the variations in the tape tension resulting therefrom.

In all known embodiments, it is necessary to provide a special drive applied on the high-speed roller or on both rollers or between the two rollers.

It is an object of the invention to provide an elastic belt type drive system of very simple construction and maintaining high performance even under severe temperature and vibration conditions.

According to the invention, a tape drive system is distinguished in that the belt guide means comprises freely rotatable roller means engaging the belt nonslippingly for squeezing a zone of said belt thereby creating resistance to the movement of the belt in this zone. In a first embodiment, the belt guide means comprise a drive roller member engaging the belt nonslippingly. In a second and preferred embodiment, the belt guiding means are freely rotatable, the belt is driven by the tape, and the roller means presses the belt on at least one of the arcuate tape portions around the reel hubs, the roller means being urged against said one tape portion by the pretensioned belt.

Other features and advantages of the invention will appear from the following description, with reference to the appended drawings in which.

Figure 1:
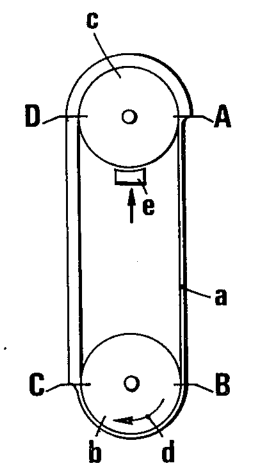
Fig. 1 PRIOR ART
FIG. 1 is a diagram explaining the operation of known systems.

The basic principle used in known tape drive systems utilizing belts is illustrated in FIG. 1. An elastic belt *a* is tensioned around two rollers *b* and *c* with a sufficient tension so that no slipping occurs between the belt and the rollers. The roller *b* rotates at a higher tangential speed than the roller *c*, for example thanks to a driving device on the roller *b* indicated by an arrow *d* and a braking device on the roller *c* shown schematically by a pad *e*. The belt thus comprises a taut part ABC which wraps the high-speed roller and a slacker part CDR which wraps the low-speed roller. The tauter part of the belt moves at a higher linear speed than the slacker part. If a supply reel and a take-up reel are placed respectively so as to bear nonslippingly on the slacker part CD and on the tauter part AB, the take-up reel has a tendency to rotate at a higher tangential speed than the supply reel. In normal operation, the tape which links the two reels cannot wind on the take-up reel faster than it unwinds from the supply reel. The result is a tension along the tape path between the reels which tension makes it possible to obtain a correct bearing of the tape on the head(s) without requiring additional thrust means. These known systems require either a drive device on the high-speed roller and a braking device on the low-speed roller or a differential drive between the rollers.

Figure 2:
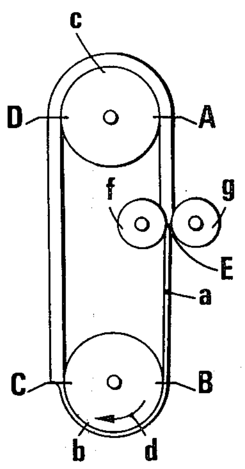
FIGS. 2 and 3 are diagrams explaining the operation of the system according to the invention.

According to a feature of the invention, illustrated in FIG. 2, the driving or braking device on the low-speed roller is eliminated. The roller *c* is then freely rotatable, the roller *b* having, as before, a driving device *d*. Moreover, two pinch rollers *f* and *g* mounted rotatingly without friction squeeze the belt in a zone E. The deformation of the belt, introduced by this pinch zone, is sufficient to create a resistance to the movement of the belt and, consequently, a tauter part EBC and a slacker part CDAE. A supply reel and a take-up reel can then be placed respectively so as to bear nonslippingly on the parts CD (or AE) and EB in order to obtain the same result as previously, namely a tension on the tape path between the supply and take-up reels.

Figure 3:
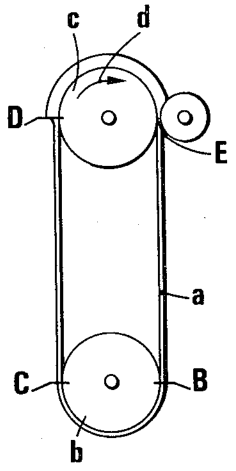

In another embodiment of the invention, the theory of which is illustrated in FIG. 3, a further inventive step is made which allows the elimination of any drive on the rollers. If the pinch zone E is placed at the point A — that is, at the point where the belt leaves the roller *c* — and if the belt is driven from this roller *c* (arrow *d*), it has been found that the belt takes on the configuration represented in FIG. 3 with a taut part EBCD and a slacker part DE on the roller *c*. Owing to the nonslip contact of the belt on the roller *c*, and to the resistance by deformation introduced on the movement of the belt by the pinch zone, the part of the belt DE is pushed back by the roller *c* and takes on a greater thickness than the rest of the belt. This belt configuration leads immediately to the surprising observation that the driven roller *b* rotates at a higher tangential speed than the driving roller *c*. It is thus possible, by replacing the roller *c* by a supply reel, to drive at a higher tangential speed a take-up reel arranged either at the place of the roller b or bearing nonslippingly on the part EB or CD of the belt.

Figure 4:
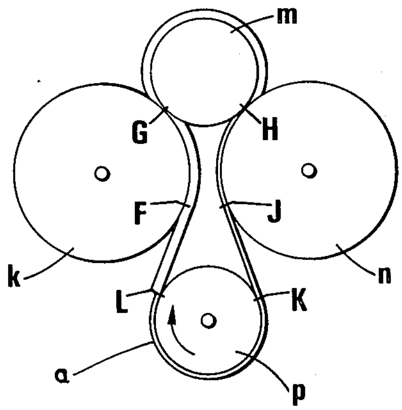
FIGS. 4 and 5 are diagrams explaining the operation of preferred embodiments of the invention.
Figure 5:
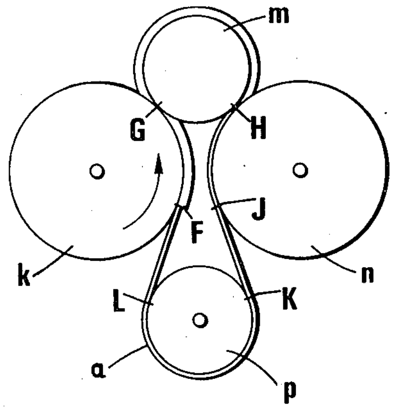

FIGS. 4 and 5 represent schematically an embodiment used practically for implementing the theory of FIG. 2 or that of FIG. 3. A supply drum *k* and a take-up drum *n* are mounted rotatingly without friction side by side. It is assumed for the moment that the tape transferred frrm one drum to the other has been removed. An elastic belt *a* comprises a part FG bearing on the supply drum, a part GH around an idler roller *m*, a part HJ bearing on the take-up drum, and a part KL around a rotating roller *p*.

The initial tension of the belt is such that no slipping occurs between the belt and any of the rollers or drums. The idler roller is applied against each of the drums by belt tension, and creates two pinch zones G and H on this belt.

If the belt is driven by rotating the roller *p* clockwise (FIG. 4), the part LKJH is tensioned up to the pinch zone H which introduces a resistance by belt deformation. The part HG is thus slacker up to the second pinch zone G, the part GFL being even slacker. In the absence of tape, the take-up drum *n* rotates faster than the supply drum *k*. If the rotating direction of the roller *p* is reversed, it is obviously the drum *k*, now constituting a take-up drum, which rotates faster than the drum *n* now constituting a supply drum. When the drums are linked by a substantially nonelastic tape, which imposes upon them an equal tangential speed, the tendency of the take-up drum to rotate faster introduces a belt tension as we saw previously. In this system, a single pinch zone would be sufficient provided it is located on the belt path running from the supply drum to the take-up drum, even if a reversible system is desired.

If the belt is driven by the supply drum *k* it takes on the configuration represented in FIG. 5 with a slightly taut part FG, a moderately taut part GH and a tauter part HJKLF, owing to the resistances introduced by the pinch zones G and H. In the absence of tape, the drum *n* rotates faster than the drum *k*. No special drive of the belt is to be provided, only the supply drum being driven, for example by pulling of the tape wound on this drum. Finally, thanks to the two symmetrical pinch zones, this system is reversible, the drum *n* being capable of supplying if it rotates in the opposite direction.

Figure 6:
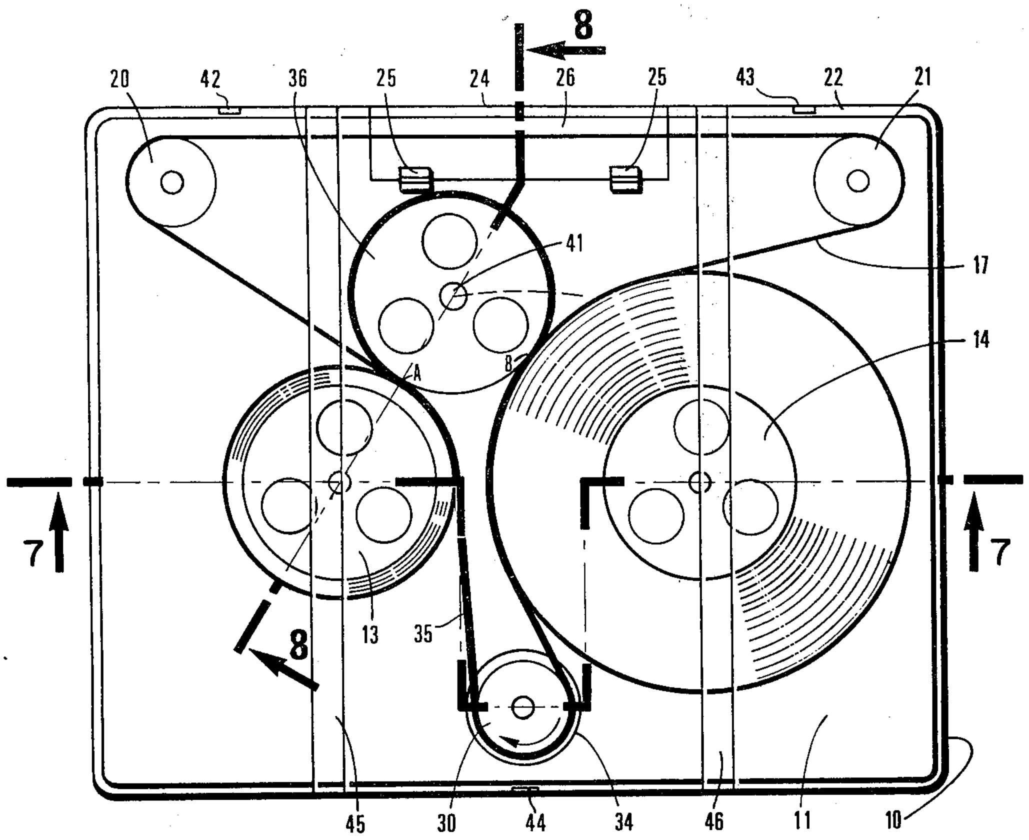
FIG. 6 represents a drive system according to the invention, made in the form of a cassette.
Figure 7:
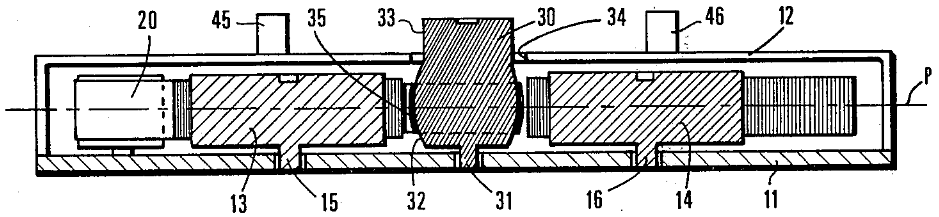
FIG. 7 is a section along line 7-7 of FIG. 6.
Figure 8:
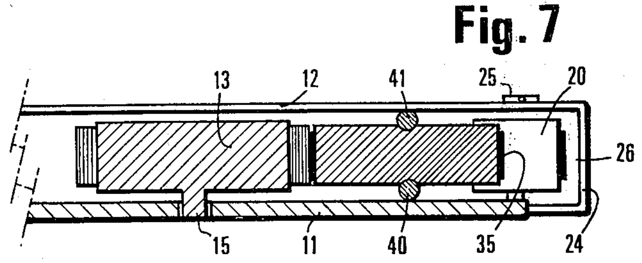
FIG. 8 is a section along line 8-8 of FIG. 6.

Referring to FIGS. 6 to 8, a cassette 10 for a magnetic recorder comprises a frame, made up of a metal deck 11 and a cover 12, in plastic for example. On the rectangular deck 11 are rotatingly mounted two reel drums 13 an 14 on respective bearings 15 and 16 substantially frictionless. These bearings can be ball bearings or, more simply, as shown in the figures, pins mounted in bushings. The axes of the drums are parallel so that the reels rotate in a plane P parallel to the deck. These axes are placed at a distance from each other chosen in accordance with the length and the thickness of the tape used so that the minimum distance between the periphery of the two reels containing the same amount of tape is very small, of the order of a few millimeters.

The magnetic tape 17, wound on the drum 14, runs through guide means and winds on the drum 13. These guide means are composed of two rollers 20 and 21 mounted rotatingly in the plane P on axes parallel to those of the reels and arranged along an edge 22 of the cassette for defining a tape path having a straight portion along this edge 22. Like the drums 13 or 14, the rollers 20 and 21 are mounted on the deck 11 on bearings which are substantially frictionless. On the straight portion of tape 17 along the edge 22, the cover has a lid 24 which can swivel on hinges 25 to clear a spot 26 for the magnetic read or write heads and the lateral tape guides.

On the deck 11 and at an equal distance from the axes of the drums 13 and 14, is rotatingly mounted a capstan 30 on a frictionless bearing 31. This capstan has a bulging part 32 inside the cassette and a lateral cylindrical extension 33 which projects beyond the cover 12 through a circular opening 34 cut out in this cover. An endless elastic drive belt 35, in rubber or plastic, is tensioned around the bulging part of the capstan 30, bears on an arc of the periphery of the reel 14, wraps around an idler 36 between a point A and a point B, and bears on an arc of the periphery of the reel 13. The idler 36, mounted floatingly with respect to the deck 11, pinches the belt 35 at the points A and B on the reels 13 and 14. The two faces of the idler 36 have recesses in which are placed balls 40 and 41 bearing respectively on the deck 11 and on the cover 12 of the cassette. The idler 36 can thus rotate and move in the plane P parallel to the deck 11.

The larger diameter part of the capstan 30 is also in the plane P. The belt 35 is thus centered automatically, in the lateral direction, so that its middle is in the plane P. The cassette has three slots, 42, 43 and 44 allowing attachment at three points. Two rails 45 and 46 placed on the cover 12 protect the lateral extension 33 of the capstan 30 if the cassette is set on its cover.

In operation, if the capstan 30 is rotated clockwise, for example, the belt 35 drives the reels in the opposite direction, thereby unwinding the tape from the drum 13 and winding it on the drum 14. As explained previously, although the idler 36 is mounted without friction, the mere pressure of this idler on the reels has the effect of producing different tensions on the different parts of the belt. These differences in telt tension results in a tension in the tape which can be varied by modifying the elasticity and the untensioned length of the belt 35, and the diameter of the idler 36. The same tape tension is obtained if the capstan 30 is driven in the opposite direction to unwind the reel 14 and to wind the reel 13.

In order for the belt tension to remain constant, whatever the distribution of the tape between the two reels, the position of the axis of the capstan is chosen so that the tension belt length varies as little as possible when the tape runs from one reel to the other. By placing the capstan as close as possible to the reels 13 and 14, and by choosing optimum values for the radii of the capstan and of the idler, it was possible to obtain a tension belt length constant to within ± 1 percent. Then, the elasticity and the length of the untensioned belt allowing the desired tape tension to be obtained are determined. However, the stiffness of the belt 35 must be sufficient so as not to cause too much delay during the starting of the tape.

In the system just described, it will be noted that the belt has substantially the same width as the tape thereby making it possible to obtain a low unit pressure of this belt on the tape. In addition, the drive belt bears on the support side of the tape and not on the oxide side. This yields a longer tape service life. Since all the bearings are mounted substantially without friction, the drive taut of the capstan is very low and the starting of the belt is very quick. Finally, owing to the elimination of friction bearings, the system has excellent performance in a wide range of temperatures and under severs vibrating conditions. In particular, tests have shown that the tape tension does not vary substantially for temperatures ranging from −55° to +70°C and that now remains within reasonable limits when the apparatus is subjected to vibrations of 10 g at a frequency of 2000 Hz.

Figure 9:
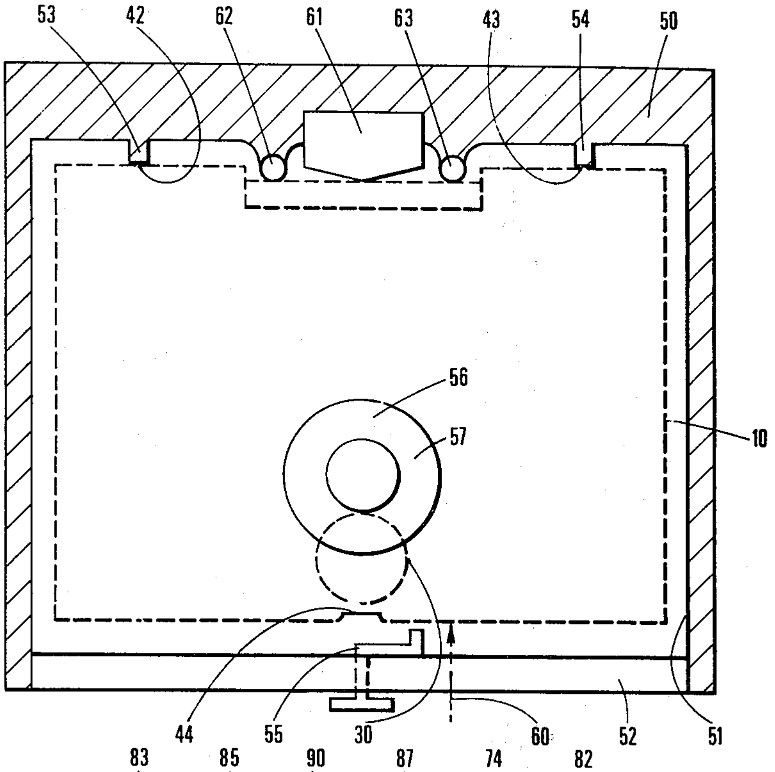
FIG. 9 represents the placing of the cassette of FIG. 1 in a recorder.

FIG. 9 represents the main parts of a recorder designed to receive the cassette of FIG. 6. A frame 50 comprises a recess 51 in which can be inserted the cassette 10 through an opening 52 in the front. This frame includes two attachment points 53 and 54 engaging with the slots 42 and 43 of the cassette 10. A swiveling lever 55 fits in the third slot 44 of the cassette after introducing it into the recess 51. On the frame 50 is arranged a motor 56 whose drive shaft 57 is laid out so that the lateral extension 33 of the capstan 30 bears on this shaft when the cassette 10 is in place in its recess 51. On the frame 50 and at the bottom of the recess 51 is also mounted a magnetic head 61 on either side of which are placed fixed guides 62 and 63. The straight part of the magnetic tape 17 of the cassette 10 bears on these guides 62 and 63 and on the head 61 when the cassette is in place in the recorder in the position represented by a broken line in FIG. 4. The cassette 10 is installed with remarkable ease, since it is sufficient to slip it into the recorder in the direction shown by the arrow 60. A simple swiveling of the lever 55 then locks the cassette.

Figure 10:
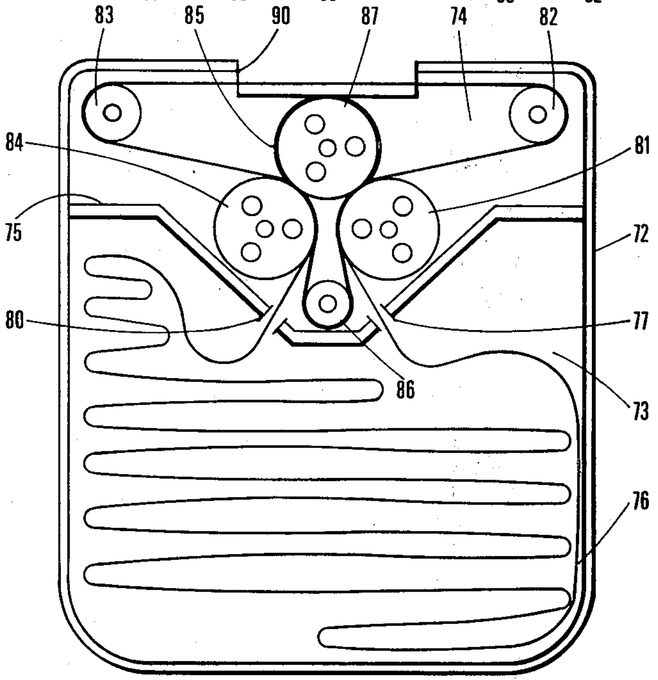
FIG. 10 is another embodiment of the drive system according to the invention.

FIG. 10 represents another embodiment of the invention in the form of a "bulk" cassette. A casing 72 comprises two compartments 73 and 74 separated by a wall 75. A magnetic tape 76 forming a continuous loop piles up in the first compartment 73, passes through a first channel 77 into the compartment 74 where it is driven by a belt drive system, and then comes back to the first compartment through a second channel 80. In the compartment 74, the tape wraps partially around a first drum 81, passes over two rollers 82 and 83 between which it has a straight run, and then wraps partially around a second drum 84 before going into the channel 80. The drums 81, 84 and the rollers 82, 83 are mounted rotatingly, substantially without friction, on the frame of the cassette. A tensioned elastic belt 85 runs around a capstan 86 mounted rotatingly on the frame and comes into contact with two arcs of tape bearing respectively on the drums 81 and 84 and passing around a floating ider 87. The floating idler 87 is pressed on the periphery of the drums 81 and 84 by the tension of the belt 85. If the capstan 86 having a lateral extension is rotated, a tension is obtained on the straight tape portion run between the rollers 82 and 83 as in the previously described examples. A magnetic head location 90 is cut out in the casing of the cassette opposite this straight tape portion.

Figure 11:
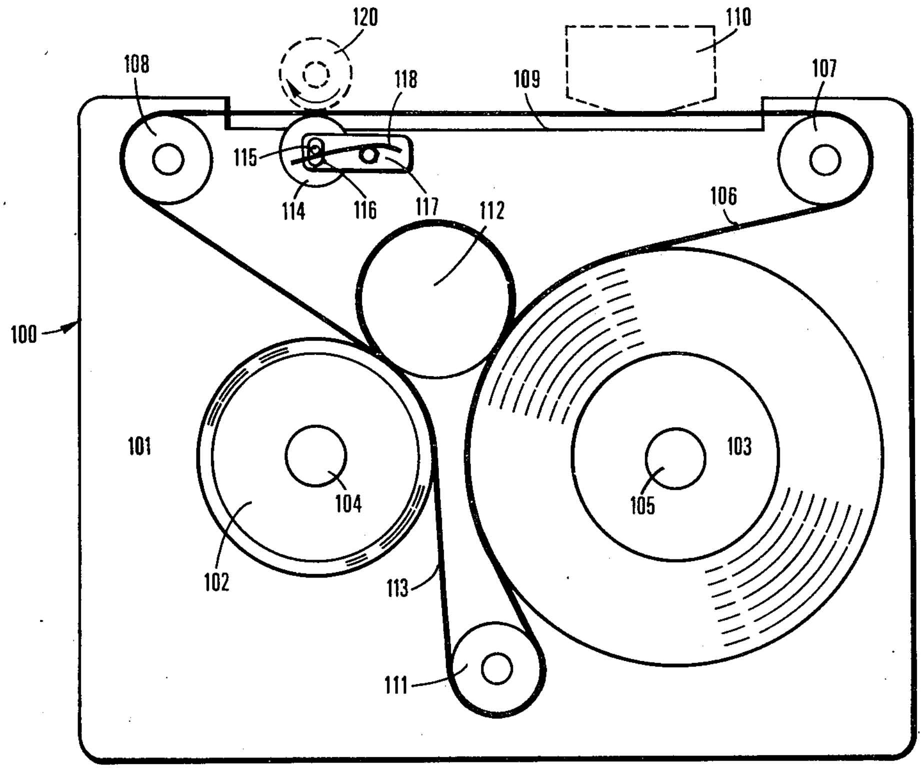
FIG. 11 is another embodiment of the invention to which preference is given.

FIG. 11 represents schematically another embodiment which uses the principle of FIGS. 3 and 5, i.e., in which the belt is driven by the supply reel.

A cassette 100 for magnetic recorder comprises a frame having a deck 101 on which are rotatingly mounted two reel drums 102 and 103 by means of respective spindles 104 and 105. A magnetic tape 106 wound on the drum 103 runs over guide rollers 107 and 108 mounted rotatingly on the deck 101 and winds on the drum 102. Between the rollers 107 and 108, the tape 106 has a straight portion on which can bear, when the cassette is in place, a magnetic head 110 (broken lines) fixed to the magnetic recorder. A cut-out portion 109 in the deck allows contact between the tape and a magnetic head having a thickness greater than that of the cassette.

On the side opposite the head 110, with respect to the plane passing through the spindle of the reels, a first roller 111 is mounted on the deck 101 by means of a frictionless bearing, for example a ball bearing. An idler 112 mounted floatingly with respect to the frame bears on the periphery of the reels 102 and 103, and is kept pressed against the magnetic tape by an elastic belt 113 tensioned around the set of rollers 111 and 112. The elastic belt is thus in nonslip contact on a tape arc on the periphery of each reel. A support 117 fixed to the deck 101 comprises grooves 116 arranged perpendicular to the straight portion of the tape. A pinch roller 114 having a spindle 115 placed in the grooves 116 comes against the tape under the action of a spring 118 so as to move it away from the frame and press it against a capstan 120 mounted on the recorder and driven in rotation by a motor (not shown). It will be noted that the pinch roller 114 can be inclined with respect to the plane of the deck, thereby providing good contact on the capstan even if, during its installation in the recorder, the cassette is not rigorously perpendicular to the axis of rotation of the capstan.

As explained earlier with reference to FIGS. 3 and 5, everything occurs as if the supply reel were a driving wheel, and a suitable tape tension is obtained owing to the differences in tension created on the different parts of the belt. As for the other embodiments described, this tape tension can be modified by changing the elasticity and the tension of the belt and the diameter of the idler 112. Likewise, the position and the diameter of the rotating roller 111 is chosen so that the length of the belt varies as little as possible when the tape passes from one of the reels to the other. In view of this latter optimization, it may moreover be advantageous to mount the belt 113 around a set of three rollers including an idler and two rotating rollers, suitably arranged on the deck 101.

With the embodiment of FIG. 11, flutter is substantially reduced, in particular at low speeds, i.e., lower than about 30 cm/sec. Continuous recording tests carried out at ambient temperature, with tape speeds of 20 cm/sec for example, gave a flutter of 1.5 percent when the tape was driven by the capstan 120 whereas this flutter was about 7 percent when the tape was driven by the roller 111.

This embodiment is thus preferable for recorders operating at low speed or for start-stop operating recorders.

In the preceding description, examples were given of embodiments of cassette type apparatus. Such a drive system is obviously applicable to recorders in which the tape supply is achieved through conventional reels mounted directly on the frame of the recorder. This drive system is also applicable to a large number of devices for winding from one tape to another any material in flexible sheet form.

We claim:

1. A tape drive system comprising a frame, means for rotatably mounting supply and takeup reels on said frame; tape guiding means on said frame for guiding a tape web traveling along a path between said supply and takeup reels;

means for unwinding said tape from said supply reel and for driving said tape along said path;

means for winding said tape on said takeup reel and for producing a tension on said tape web, comprising a pretensioned endless elastic belt having a first portion engaging an arcuate portion of the tape on said supply reel without slippage to be driven by said tape, a second portion engaging an arcuate portion of the tape on said takeup reel without slippage for winding said tape on said takeup reel, a third portion connecting first ends of said first and second portions, and a fourth portion connecting second ends of said first and second portions;

first idler roller means mounted for rotation substantially without friction on said frame for guiding but not driving said third belt portion; and second roller means rotatable substantially without friction and movable relative to said frame for guiding said fourth belt portion, said second roller means being urged by said belt toward said reels for squeezing and elastically deforming said second ends of said first and second belt portions against said supply and takeup reels respectively to oppose movement of said first belt portion thereby producing a tension on said tape web when said tape is unwound from said supply reel.

2. The tape drive system of claim 1 wherein said second roller means comprises an idler roller member mounted for rotation substantially without friction about an axis movable relative to said frame, and means for maintaining said roller member at a predetermined distance from said frame.

3. The tape drive system of claim 1 wherein said first and second belt portions pass between said tape reels from said first roller means to said second roller means so that the tension of said belt urges said second roller means toward sais tape reels.

4. The tape drive system of claim 1 wherein said means for driving said tape comprises means for engaging said tape along said path.

5. The tape drive system of claim 1 wherein said tape is a magnetic tape having a non sensitive surface, said belt engaging said arcuate tape portions on said non sensitive surface of said tape.

6. The tape drive system of claim 5 wherein said belt is substantially as wide as said tape.

7. A tape drive system comprising a frame having means for rotatably mounting two tape packs with a tape web connecting said packs;

tape guiding means mounted on said frame for defining a tape path for said tape web;

tape driving means on said frame engaging said tape web for driving said tape;

a first roller spaced apart from said tape packs and rotatably mounted substantially without friction on said frame;

a second roller rotatable substantially without friction and adapted to be urged toward said tape packs in tangential relationship with said tape packs; and a pretensioned endless elastic belt extending around said first and second rollers and engaging two arcuate tape portions of said tape packs respectively in a slipless relationship to be driven exclusively by said tape, said belt being squeezed and elastically deformed between said second roller and each of said tape packs in such a way that this squeezing action opposes the movement of said belt induced by said tape to produce tension on said tape web.

8. The tape drive system of claim 7 wherein said rollers and said belt are disposed in a configuration such that the tension of said belt urges said second roller toward said tape packs.

9. The tape drive system of claim 7 further comprising means for maintaining said second roller at a predetermined distance from said frame.

10. The tape drive system of claim 7 wherein said tape is a magnetic tape having a non-sensitive surface and said tape reels are wound with waid non-sensitive surface directed outwardly so that said belt engages said reels on said non-sensitive surface.

11. A tape cartridge comprising a housing;

first and second tape drums rotatably mounted about spaced parallel axes in a plane in said housing with a tape web extending between said drums;

tape guiding means on said housing for guiding said tape web along a path between said first and second drums, said path having a straight portion along one edge of said housing;

a compartment for storing tape being supplied to said first drum and removed from said second drum;

means adjacent said straight portion for pressing said tape web against external capstan means to drive said tape web;

a pretensioned endless elastic belt having two arcuate portions passing between and engaging said tape web without slippage as said web passes around said first and second drums, respectively, said belt being driven exclusively by said tape web; and rollers disposed in said plane for rotation substantially without friction relative to said housing for guiding but not driving said belt along first and second belt paths between said belt arcuate portions, said rollers comprising a first idler roller member rotatably mounted about a stationary axis and engaged by said belt along a portion of said first belt path; and a second roller member engaged by said belt along said second belt path to be urged by the tension of said belt into tangential relationship with said drums for squeezing and elastically deforming said belt at the ends of said second belt path against both of said drums so that such squeezing action opposes the movement of said belt to produce a tension on said tape web when said tape is driven by said capstan means.

12. A tape cartridge according to claim 11 further comprising means for maintaining said second roller member in said plane.

13. A tape cartridge according to claim 12 wherein said tape is a magnetic tape having a non-sensitive surface and said tape is supplied to said drums with said non-sensitive surface directed outwardly so that said belt engages said tape web on the non-sensitive surface thereof.

14. A tape drive system comprising a frame, means for rotatably mounting supply and takeup reels on said frame;

tape guiding means on said frame for guiding a tape web traveling along a path between said supply and takeup reels;

means for winding said tape on said takeup reel and for producing a tension on said tape web, comprising a pretensioned endless elastic belt having a first portion engaging an arcuate portion of the tape on said supply reel without slippage to drive said tape, a second portion engaging an arcuate portion of the tape on said takeup reel without slippage for winding said tape on said takeup reel, a third portion connecting first ends of said first and second portions, and a fourth portion connecting second ends of said first and second portions;

first roller means mounted for rotation substantially without friction on said frame for guiding and driving said third belt portion; and second roller means rotatable substantially without friction and movable relative to said frame for guiding said fourth belt portion, said second roller means being urged by said belt toward said reels for squeezing and elastically deforming said second ends of said first and second belt portions between said second roller means and both of said supply and takeup reels respectively to oppose movement of said first belt portion thereby producing a tension on said tape web when said tape is unwound from said supply reel.

15. The tape drive system of claim 14 wherein said second roller means comprises an idler roller member mounted for rotation substantially without friction about an axis movable relative to said frame, and means for maintaining said roller member at a predetermined distance from said frame.

16. The tape drive system of claim 14 wherein said first and second belt portions pass between said tape reels from said first roller means to said second roller means so that the tension of said belt urges said second roller means toward said tape reels.

17. A tape cartridge comprising a housing;

a pair of tape packs rotatably mounted about spaced parallel axes in a plane in said housing with a tape web connecting said packs;

tape guiding means for defining a tape path for said tape web, said tape path having a straight portion along one edge of said housing;

means for pressing said tape web against external capstan means to drive said tape;

a pretensioned endless elastic belt having two arcuate portions passing between and engaging said tape packs respectively without slippage, said belt being driven by said tape exclusively; and rollers dispoed in said plane for rotation substantially without friction relative to said housing for guiding but not driving said belt along first and second belt paths between said belt arcuate portions, said rollers comprising a first idler roller member rotatably mounted about a stationary axis and engaged by said belt along a portion of said first belt path; and a second idler roller member engaged by said belt along said second belt path to be urged by the tension of said belt into tangential relationship with said packs for simultaneously squeezing and elastically deforming said belt at the ends of said second belt path against said tape packs respectively so that such squeezing action opposes the movement of said belt to produce a tension on said tape web when said tape is driven by said capstan means.

18. A tape cartridge according to claim 17 further comprising means for maintaining said second roller member in said plane.

19. A tape cartridge according to claim 18 wherein said tape is a magnetic tape having a non-sensitive surface and said tape packs are wound with said non-sensitive surface directly outwardly so that said belt engages said tape packs on said non-sensitive surface of said tape.

* * * * *